United States Patent [19]

Fahle et al.

[11] 4,345,009

[45] Aug. 17, 1982

[54] FUEL CELL STACK COMPRESSIVE LOADING SYSTEM

[75] Inventors: Ronald W. Fahle, Manchester; Carl A. Reiser, Glastonbury, both of Conn.

[73] Assignee: United Technologies Corporation, Hartford, Conn.

[21] Appl. No.: 67,577

[22] Filed: Aug. 17, 1979

[51] Int. Cl.$^3$ ............................................ H01M 2/08
[52] U.S. Cl. ........................................ 429/37; 429/38
[58] Field of Search ........................ 429/37, 38, 39, 40

[56] References Cited

U.S. PATENT DOCUMENTS 3,516,867  6/1970  Dankese ................................ 136/86

Primary Examiner—Charles F. LeFevour
Attorney, Agent, or Firm—Stephen E. Revis

[57] ABSTRACT

A fuel cell module comprising a stack of fuel cells with reactant gas manifolds sealed against the external surfaces of the stack includes a constraint system for providing a compressive load on the stack wherein the constraint system maintains the stack at a constant height (after thermal expansion) and allows the compressive load to decrease with time as a result of the creep characteristics of the stack. Relative motion between the manifold sealing edges and the stack surface is virtually eliminated by this constraint system; however it can only be used with a stack having considerable resiliency and appropriate thermal expansion and creep characteristics.

6 Claims, 4 Drawing Figures

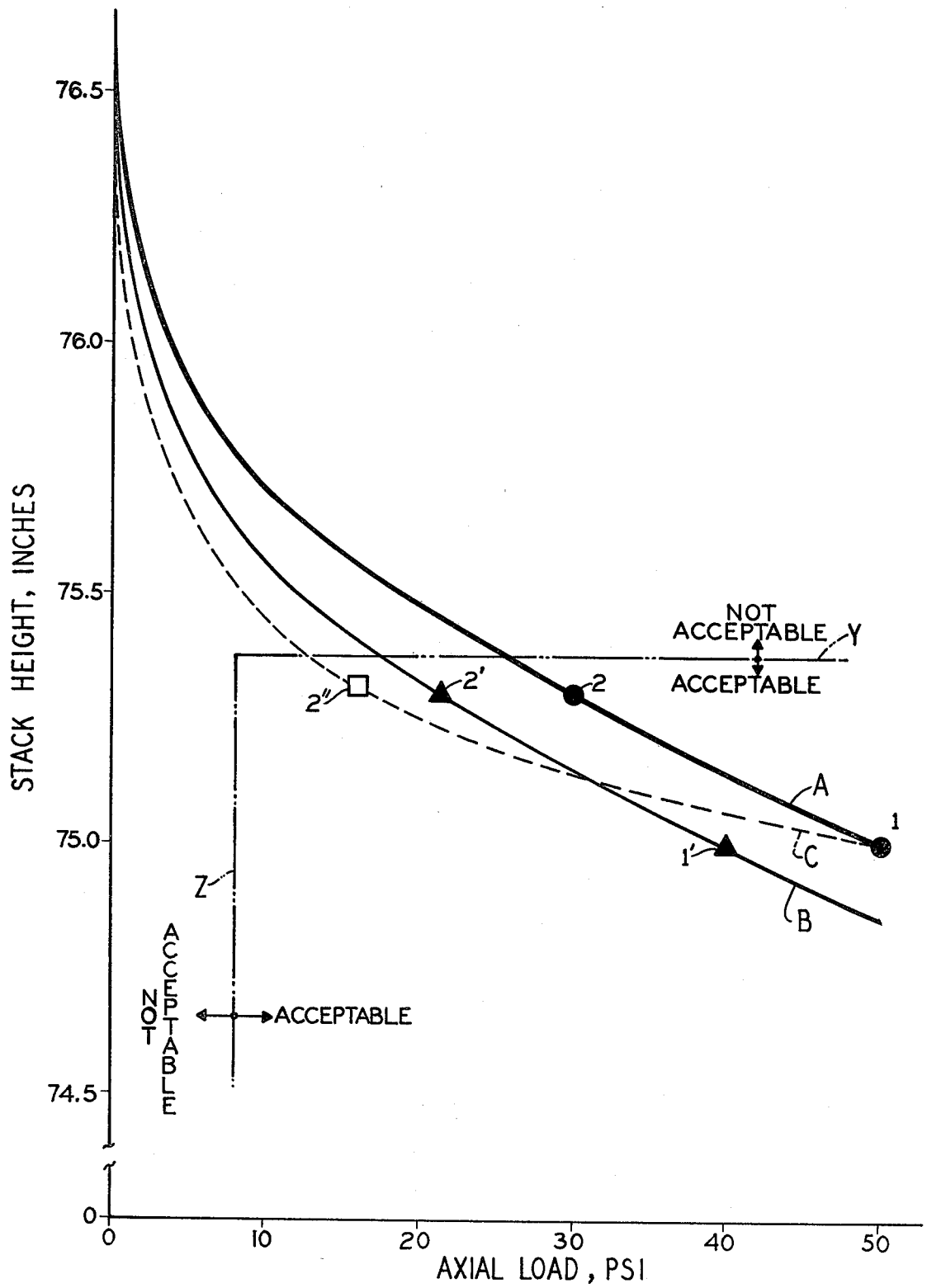
FIG. 4  AXIAL LOAD PRESSURE VS STACK RELAXATION
(300 CELL STACK EXAMPLE)

FUEL CELL STACK COMPRESSIVE LOADING SYSTEM

The Government has rights in this invention pursuant to Contract no. ET-77-C-03-1471 awarded by the Department of Energy.

BACKGROUND OF THE INVENTION

1. Field of the Invention

This invention relates to electrochemical cells, and more particularly to stacks of fuel cells having external reactant gas manifolds.

2. Description of the Prior Art

One type of fuel cell comprises an anode electrode spaced apart from a cathode electrode with an electrolyte disposed therebetween in the space between the two electrodes; each electrode also includes a catalyst layer on the electrolyte side thereof. On the nonelectrolyte side of the anode electrode is a reactant gas passage for carrying a fuel, and on the nonelectrolyte side of the cathode electrode is a reactant gas passage or chamber for carrying an oxidant. The electrodes are constructed so that the reactant gas diffuses therethrough and comes into contact with the electrolyte in the catalyst layer thereby causing an electrochemical reaction whereby ions travel from one electrode to the other through the electrolyte and electrons travel from one electrode to the other via an external circuit. The flow of electrons is the useful electric current produced by the cell. In an electrolysis cell the opposite occurs. Electrical current is supplied to the cell and gases are generated at the electrodes.

In a fuel cell powerplant a plurality of fuel cells are connected electrically in series through electrically conductive, gas impervious plates separating adjacent cells, thereby forming a stack of fuel cells. These separator plates, in combination with the electrodes adjacent thereto, generally define the reactant gas passages hereinbefore referred to.

There are two basic approaches for feeding reactant gases to the individual cells within the stack. These approaches are via internal manifolding and external manifolding. Representative of internal manifolding is U.S. Pat. No. 3,012,086. Representative of external manifolding is commonly owned U.S. Pat. No. 3,994,784. In the case of internal manifolding, the reactants are fed to the stack via channels passing through the cells in a direction perpendicular to the plane of the cells. These internal perpendicular channels communicate with the cell reactant gas passages which are generally oriented parallel to the plane of the cell. The peripheral portions of each cell component abut the peripheral portions of adjacent components and form continuous seals around the outer edge of each cell and between adjacent cells so that reactant gases and electrolyte cannot escape from within the cells. An axial (i.e., perpendicular to the plane of the cells) loading system is used to ensure adequate sealing and good electrical and thermal conductivity between adjacent cells and components. Typically the cells are compressed between a pair of end plates using tie bolts to interconnect the end plates and urge them toward one another. Any desired compressive force can be applied to the stack by suitable tightening of the tie bolts.

One problem associated with maintaining a compressive load on a stack of fuel cells is the difference between the thermal expansion characteristics of the stack and the axial loading system, in combination with the creep characteristics of conventional cell components. Generally the axial loading system has a higher coefficient of thermal expansion than the stack materials, resulting in a loss of compressive load upon heating the stack. Creep of the cell components with time also results in reduced compressive forces on the stack. A stack of cells which is not particularly resilient may not be able to tolerate excessive thermal expansion mismatch since the compressive loads may fall off to the point where sealing and electrical contact between components and between cells is not adequate. Creep of the cell stack presents a similar but long term problem. Of course, the tie bolts could be tightened down periodically although the necessity for doing this is not desirable.

A solution to this problem is a mechanical load follow-up system built into the axial loading system for the purpose of trying to maintain the compressive load relatively constant as the stack height changes due to thermal expansion mismatch and creep. Commonly owned U.S. Pat. No. 3,253,958 describes one such system. While no known load follow-up system is perfect, they do significantly reduce the extent to which the compressive load would otherwise drop off during operation and with time.

Although axial load follow-up systems work well in some situations, they are complex, expensive, and not desirable for large stacks with external reactant gas manifolds. Referring again to U.S. Pat. No. 3,994,748, external manifolds are used with fuel cells having reactant gas passages extending from one edge of the cell to the opposite edge of the cell. The reactant gas is fed into these passages from a manifold on one side of the stack, travels through the cells and exits from the passages into a manifold on the opposite side of the stack. The inlet manifold covers an entire side of the stack and must be sealed around its outer edge against the side of the stack. The same is true for the outlet manifold. In a stack of several hundred cells, thermal expansion and, in particular, creep can result in a change of stack height on the order of two inches or more, depending on the size of the stack. It is very difficult to maintain an effective seal around the edge of the manifold where there is that much relative movement between the cells and the manifold, such as is the case with an axial load follow-up system which permits the stack height to change with time due to creep. Of course, stacks with internal reactant gas manifolding do not have this problem, however, they are inherently more expensive than external manifolding.

SUMMARY OF THE INVENTION

It is one object of the present invention to provide an axial loading system for a stack of externally manifolded fuel cells.

It is another object of the present invention to avoid the complexity of an axial load follow-up system.

It is yet another object of the present invention to significantly reduce the amount of relative movement between an external manifold and its associated cells over the design life of the stack.

Accordingly, the present invention is a fuel cell module comprising a stack of fuel cells with external reactant gas manifolds and a constraint system for applying a compressive force on the stack, wherein the constraint system is constructed and arranged to prevent any substantial change in stack height due to the creep characteristics of the stack during the design life of the module, and wherein the stack spring rate, creep characteristics, and thermal expansion characteristics coupled with the thermal expansion characteristics of the constraint system always result in a sufficiently high compressive force to ensure acceptable electrical and thermal conductivity through the stack and adequate reactant gas sealing between cell components over the design life of the module.

More simply, a rigid constraint system, after thermal expansion, maintains the stack at a constant height thus permitting the compressive load to decrease as a result of the creep characteristics of the fuel cells within the stack. The stack must be resilient and have appropriate creep and thermal expansion characteristics in order to be used with such a constraint system and still be certain that adequate electrical, sealing and thermal contact is maintained during the design life of the stack. By the use of the rigid or "locked-up" constraint system of the present invention there will be no relative movement between the sealing edges of the manifolds and the external surfaces of the stack. If the external reactant gas manifolds seal against the external surfaces of the stack, the maximum possible relative movement between the sealing edges of the manifolds and the stack is the thermal expansion mismatch between the constraint system and the manifolds since the stack "expands" to this height due to its resiliency. Even though this possible relative motion is not large, it can be virtually eliminated by selecting a manifold material having substantially the same coefficient of thermal expansion as the constraint system. Thus, the manifold grows with the stack and constraint system and relative movement between the sealing surfaces due to thermal expansion mismatch is completely eliminated. Once operating temperature is reached and thermal expansion is completed the rigid or "locked-up" constraint system of the present invention maintains the stack height constant. Therefore no relative movement occurs at any time during operation of the fuel cells. This later feature of the present invention is important since in axial load follow-up systems of the prior art the change in stack height due to creep is many times greater than that due to thermal expansion. For example, a 500 cell stack with a prior art axial load follow-up system may creep or change height by as much as two or three inches. Although the present invention is useful with a stack having any number of cells, it is clearly most useful for stacks with large numbers of cells (say, greater than 100 cells) wherein the relative movement between the manifold and the stack would be that much greater due to the cumulative effect of changes in cell thickness.

In one embodiment of the present invention the constraint system comprises a pair of stiff plates at each end of the stack interconnected with the tie bolts which are tightened down so as to apply a certain initial compressive load on the stack at room temperature. This constraint system is virtually inflexible. The distance between the end plates increases due to thermal expansion as the cell temperature, and thus the constraint system temperature increases. The stack height increases this same distance due to stack resiliency and its own thermal expansion. During steady state operation at temperature the stack remains at this same height. With time, the creep characteristics of the cells results in a significant reduction of the compressive load. Permitting the load to decrease has the added benefit of reducing the extent of further creep which also eliminates the continuous reduction in porosity of the substrate and resultant performance loss inherent in axial load follow-up systems. This type of system can only be used, however, with a stack of fuel cells having certain properties or characteristics which will ensure that adequate electrical conductivity through the stack and sealing contact between components is maintained despite the loss in compressive load.

In an alternate embodiment of the present invention the manifolds are used to interconnect end plates and the tie rods are eliminated. The manifolds, in this alternate embodiment, must be made relatively strong and inflexible.

The foregoing and other objects, features and advantages of the present invention will become more apparent in the light of the following detailed description of preferred embodiments thereof as discussed and illustrated in the accompanying drawing.

DESCRIPTION OF THE PREFERRED EMBODIMENT

Figure 1:
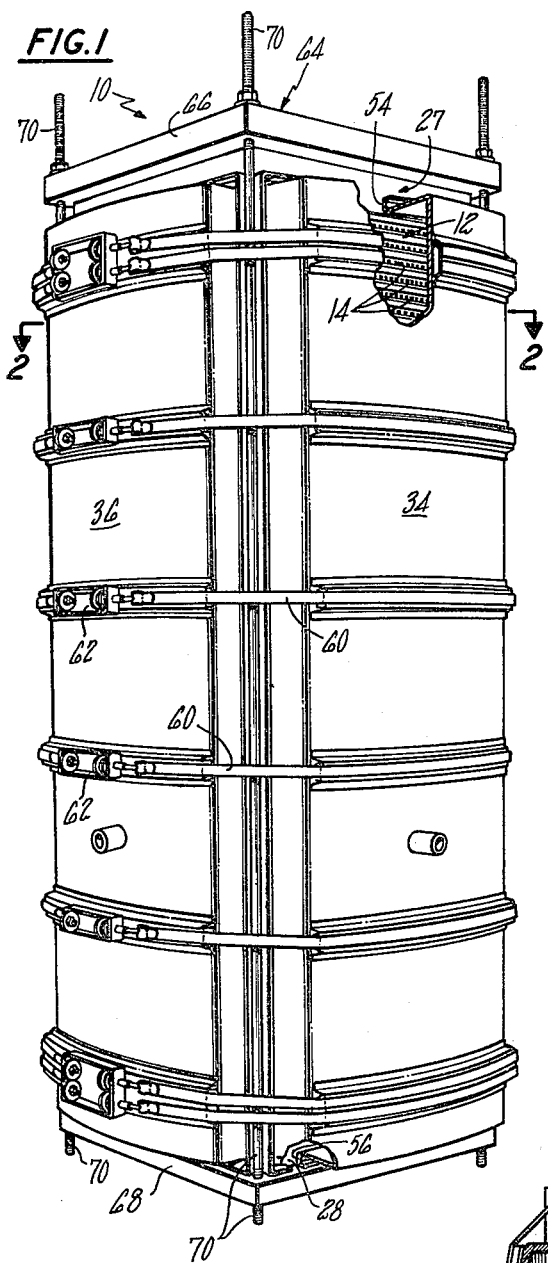
FIG. 1 is a perspective view, partly broken away, showing a fuel cell module according to the present invention.
Figure 3:
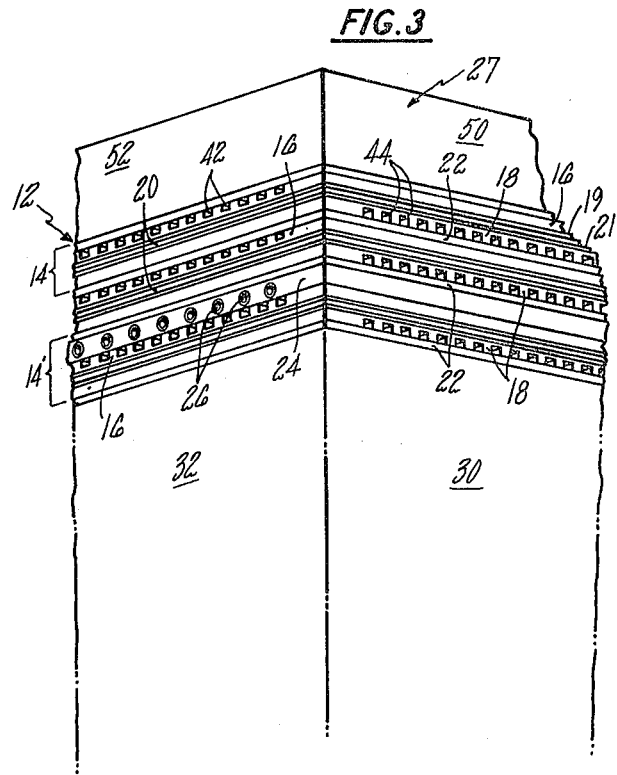
FIG. 3 is a perspective view of a portion of the stack of fuel cells of FIG. 1 with the manifolds and constraint system of FIG. 1 removed.
Figure 2:
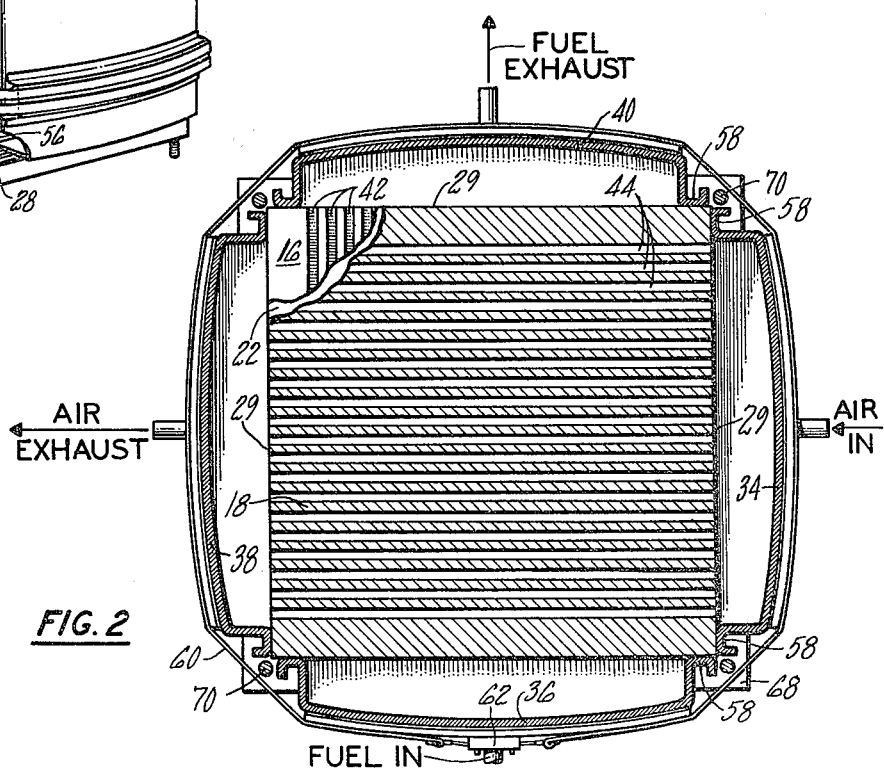
FIG. 2 is a sectional view taken along the line 2—2 in FIG. 1. The section is taken parallel to the plane of the cells cutting through the reactant gas channels of a cathode electrode.

As an exemplary embodiment of the present invention consider the fuel cell module 10 of FIG. 1 which is shown in cross section in FIG. 2. For purposes of orienting the reader, the lower right corner of FIG. 2 is the corner of the module 10 pointing toward the viewer. The module 10 includes a stack 12 of fuel cells 14. As shown in FIG. 3, each fuel cell 14 comprises a gas porous anode electrode 16 and a gas porous cathode electrode 18 spaced apart with an electrolyte retaining matrix layer 20 disposed therebetween. Each electrode 16, 18, includes a very thin catalyst layer 19, 21, respectively, on the surface thereof adjacent the matrix layer 20. An electrically conductive, gas impervious plate 22 separates adjacent fuel cells in the stack 12. For purposes of this application it will be assumed that each fuel cell in the stack includes one separator plate 22 such that the phrase "fuel cell" will encompass a repeating unit of the stack which includes one separator plate. The fuel cells of this exemplary embodiment are the same as shown in commonly owned U.S. Pat. No. 4,115,627 which is incorporated herein by reference.

In this embodiment every third fuel cell 14' (FIG. 3) includes a coolant carrying layer 24 disposed between the electrode 16 and the separator plate 22. Passing in-plane through this layer 24 are coolant carrying tubes 26. The coolant flowing through these tubes carries away the heat generated by the fuel cells. The number of coolant layers 24 and tubes 26 required by a stack is dictated by a variety of factors which need not be discussed in this application. The stack 14 is completed by top and bottom flat graphite blocks 27, 28, respectively, which are bonded to the separator plates 22 at each end of the stack.

As shown in the drawing, the outer edges 29 of the stack components 16, 18, 20, 22, 24, 27 and 28 form four outwardly facing planar surfaces which are the external surfaces of the stack 12. Portions of two of these surfaces are shown in FIG. 3 and are designated by the numerals 30 and 32. Each of the four surfaces is substantially completely covered by a reactant gas manifold. An air or oxygen gas inlet manifold 34 covers the surface 30 while a fuel or hydrogen gas inlet manifold 36 covers the surface 32. The opposing surfaces are covered by an air outlet manifold 38 and a fuel outlet manifold 40 (FIG. 2).

While the manifolding arrangement just described incorporates an outlet manifold on each side of the stack opposite an inlet manifold, this has been done for the purposes of simplicity of the present description. Preferably the invention of hereinabove referenced U.S. Pat. No. 3,994,748 would be used wherein a fuel manifold covering one surface of the stack is divided into compartments and serves as both the inlet and outlet manifold, while the manifold on the opposite surface of the stack serves as a mixing manifold. Further details concerning this preferred manifolding arrangement can be found in said U.S. Pat. No. 3,994,784 which is incorporated herein by reference.

As mentioned above, the basic fuel cell repeating unit 14 is the same as that shown and described in commonly owned U.S. Pat. No. 4,115,627. More specifically, the electrolyte used in these fuel cells is phosphoric acid, and the matrix layer 20, which is saturated with this electrolyte, is made from silicon carbide particles with a binder such as polytetrafluoroethylene. A more detailed description of this matrix layer is shown and described in commonly owned U.S. Pat. No. 4,017,664. The anode electrode 16 and the cathode electrode 18 both comprise relatively thick substrates with ribs formed on one side thereof defining reactant gas channel 42, 44, respectively. The fuel gas channels 42 carry hydrogen or a hydrogen-rich gas across the cells from the inlet manifold 36 to the outlet manifold 40. The air channels 44 carry air across the cells from the inlet manifold 34 to the outlet manifold 38. The substrates comprise a uniform mixture of about 80% chopped carbon fibers and 20% phenolic resin and have a porosity of approximately 70%. The overall thickness of each substrate is about 65 mils. The flat surface of each substrate, which is opposite to the surface having the ribs (and thus the gas channels), has a layer 19, 21 of supported platinum catalyst disposed thereon which is about 2.5 mils thick on the anode substrate and 5 mils thick on the cathode substrate. The coolant layers 24 are made from the same material as the electrode substrates although it may be made less porous than the substrates.

The graphite blocks 27, 28 have the same outer dimensions as the other stack components, and their outwardly facing surfaces (two of which, 50 and 52, can be seen in FIG. 3) provide smooth sealing surfaces for the top and bottom sealing flanges 54, 56 of each manifold. A thick block at one end of the stack is required to accommodate the possible differences in stack height which could result from the buildup of the very small tolerances in the thickness of the many hundreds of components in the stack 12. For example, a stack of 400 cells each having a thickness of about 0.25 inch with a tolerance of ±0.004 inch could have an overall height of anywhere from 98.4 to 101.6 inches. The manifolds, on the other hand, have a fixed height. A large block thickness is thus required to ensure that both the top and bottom flanges 54, 56 are located somewhere on the smooth sealing surfaces of the blocks 27, 28 after the desired compressive force has been applied to the stack as hereinafter explained.

As best shown in FIG. 2, the vertically extending flanges 58, seal against the external surfaces of the stack 12 near the corners of the stack which do not have reactant gas channels. A sealing material, such as fibrous polytetrafluoroethylene, is disposed between the manifold flanges 54, 58 and the surfaces of the stack. Steel bands 60 (FIGS. 1 and 2) surround the stack manifolds and hold them in sealing relationship with the stack and graphite blocks. Turn buckles 62 connecting the ends of each band permit tightening the bands to the extent necessary to ensure adequate sealing.

As previously discussed, to obtain good electrical, thermal, and sealing contact between the various components of the cells and the stack 12, the module 10 includes a constraint system 64. In this exemplary embodiment, the constraint system 64 comprises inflexible top and bottom steel plates 66, 68, respectively, and tie bolts 70 connecting the plates. The plates 66, 68 rest flat against the graphite blocks 27, 28, respectively. In assembling a module 10, the constraint plates 66, 68, the blocks 48, 49, and the various stack components are arranged one atop the other in proper sequence. This assembly is placed in a press whereupon a preselected axial (i.e., perpendicular to the plane of the cells) load is applied to the plates 66, 68 to compress the stack 12. The tie bolts 70 are then tightened down to an extent that, when the assembly is removed from the press, the compressive force on the stack 12 is of approximately the desired magnitude. The manifolds 34, 36, 38 and 40 are then positioned against the sides of the stack and secured by the bands 60.

Since the constraint system 64 and the manifolds 34, 36, 38 and 40 are made from similar materials (stainless steel) they have the same or approximately the same coefficient of thermal expansion. Therefore, when the stacks heat up during operation these items grow at approximately the same rate. Although the stack 12 has a lower coefficient of thermal expansion, as the plates 66, 68 move apart the elasticity or spring rate of the compressed stack results in the height of the stack increasing by the same rate with an accompanying loss in axial load. Thus, there is virtually no relative movement between the graphite blocks 27, 28 and their respective manifold sealing flanges 54, 56 during thermal expansion. Likewise, there is virtually no relative motion between the stack external surfaces, such as 30 and 32, and the vertical manifold sealing flanges 58. Once steady state is reached the constraint system holds the stack height constant. Thus, throughout operation the manifold seals do not have to accommodate any significant relative motion.

Compare the foregoing to the prior art axial load follow-up system. Rather than maintaining the stack height constant and allowing the compressive forces to decrease as a result of creep characteristic of the components, the load follow-up system permits the stack height to decrease under the load by providing a resilient (as opposed to rigid) constraint system to maintain a fairly constant load on the stack as its height changes.

FIG. 4 is a graphic representation showing the relationship between the stack height and the axial compressive load on the stack resulting from the combination of thermal expansion, creep, and springback or resiliency characteristics of the module and in particular of the stack. The graph assumes a stack of 300 cells having components as hereinabove described with respect to the stack of FIG. 3.

As regards the present invention, the curve A depicts the load/height characteristics at time zero of a stack of 300 cells having properties and characteristics in accordance with the present invention. The curve B is representative of the stack properties and characteristics after being under compressive load for a period of time (time t). Point 1 on the curve A denotes the stack height at room temperature and time zero under the initially applied compressive load of 50 psi. Point 2 tells us that if the initial compressive load were 30 psi the stack height would be 75.3 inches. Put another way, if, after initial compression, the stack is permitted to expand from 75.0 to 75.3 inches, the axial compressive load would decrease from 50 to 30 psi. This latter situation is what actually happens to the fuel cell module of the present invention. As the temperature of the module increases during startup, the differential in the rates of thermal expansion between the constraint system and the stack as well as the resiliency or springback characteristics of the stack result in movement along the curve A from point 1 to point 2.

It is the high springback rate of the stack or steep slope of the curve A which ensures that the compressive load does not fall too rapidly. Compare this with the dotted curve C which is representative of a stack having a much lower spring rate. Note that for the same stack height (point 2") the load is only 16 psi. The importance of a high springback rate will become more apparent later. The limiting factor on load reduction during startup is the increase in distance between the plates 66 and 68 resulting from thermal expansion. The load reduction resulting from this thermal expansion is the result of increasing cell component thickness. The horizontal line Y on the graph represents the maximum permissible stack height wherein separation or nonconformity between the mating surfaces becomes so great as to be unacceptable (due to gas leakage and/or excessive internal electrical resistance) at any axial load. In this example point 2 is the maximum height reached by the stack at maximum operating temperature (400° F.) at the beginning of operation. Note that it is below the line Y.

As earlier mentioned, curve B represents the stack properties and characteristics after the stack has been under compressive load for a period of time t. The difference between the curves A and B result from the creep characteristics of the stack. Because the constraint system permits no further stack height increase after thermal expansion, the axial load drops off as a result of this stack creep characteristic. FIG. 4 shows that after a time t the axial load drops from 30 psi (point 2) to 21.5 psi (point 2').

The vertical line Z represents the minimum axial load required at any stack height to ensure adequate electrical conductivity, thermal conductivity, and reactant gas sealing between the cell components. In FIG. 4, the horizontal distance between point 2' and the line Z is the amount of additional load reduction which can be tolerated as a result of stack creep characteristics.

From the foregoing it is clear that the stack must always be operating at points on the curves A and B which are simultaneously below the line Y and to the right of the line Z. In the general case, assume that a stack is initially compressed to a height X at room temperature and also assume that Y is the maximum stack height at which contact between cell components still results in acceptable electrical and thermal conductivity and adequate reactant gas sealing between the cell components. Assuming, also, that the thermal expansion characteristics of the module are such that, at maximum operating temperature, the constraint system permits the stack to increase in height by an amount $\Delta X$, then, according to the present invention the following equation must be satisfied under all conditions:

$$X + \Delta X \leq Y \quad \text{(Equation 1)}$$

Additionally, assume Z is the lowest axial load on the stack which will ensure acceptable electrical and thermal conductivity through the stack and adequate reactant gas sealing between the cell components at any stack height. Furthermore, assume the axial compressive force at time zero and at room temperature is F. Then, in accordance with the present invention, both the creep and thermal expansion characteristics of the module result in a reduction of the force F by an amount $\Delta F$ over the design life of the module, and the following equation must always be satisfied:

$$F - \Delta F \geq Z \quad \text{(Equation 2)}$$

By way of further explanation of the foregoing, X (on curve A) is 75 inches (point 1), $\Delta X$ is the increase in height between point 1 and point 3 (0.3 inch), and Y equals 75.375 inches. Since this worst situation satisfies Equation (1) above, Equation (1) would be satisfied under all conditions. As regards Equation (2), F is 50 psi (point 1). This force drops by 20 psi to 30 psi (point 3) as a result of thermal expansion. Assuming curve B is representative of the module characteristics at the end of the module design life, point 2' indicates that a further reduction in the axial force of 8.5 psi results from creep. Therefore the initial axial force of 50 psi is ultimately reduced to 21.5 psi by thermal expansion and creep over the module design life (i.e., $\Delta F = 28.5$). Since 21.5 psi is greater than Z (8.5 psi), Equation (2) is satisfied. It is apparent that the design life of the module depicted in FIG. 4 is much longer than that represented by the curve B. On the other hand, compare this with the dotted curve C. Note how close point 2" is to the line Z even at time zero. The locked-up constraint system of the present invention would not be suitable with a stack having such properties since the stack creep characteristics would quickly result in a compressive force insufficient to maintain adequate electrical, thermal and/or sealing properties.

In an alternate embodiment of the present invention the upper and lower sealing flanges of the manifolds may be bolted directly to the graphite blocks and provide the constraint system which maintains the stack height constant after thermal expansion. In other words, referring to FIG. 1, the manifolds and graphite blocks 27, 28 would replace the constraint system 64 consisting of the plates 66, 68 and the tie rods 70. On the other hand, the graphite blocks could be eliminated and a metal plate substituted therefore. The manifolds would be secured directly to the metal plates. In these alternate embodiments the manifolds would have to be made considerably stronger (i.e., thicker) than the manifolds which could be used in the earlier described embodiment wherein they are only under "radial" load.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of our invention, that which we claim as new and desire to secure by Letters Patent of the United States is:

1. A fuel cell module comprising:

a pair of end blocks, spaced apart;

a large number of fuel cells stacked and under compression between said blocks along an axis perpendicular to the plane of said cells, each cell including a plurality of components, said stack and said blocks forming outwardly facing planar surfaces parallel to said axis;

a reactant gas manifold associated with at least one of said planar surfaces and substantially covering said surface, each manifold including edge means sealed against its respective surface for preventing leakage from said manifold;

constraint means forcing said end blocks toward each other to create a compressive force on said stack of cells in said axial direction, wherein said constraint means and said end blocks are constructed and arranged to result in a stack height of X at room temperature and to prevent any substantial change in stack height due to creep of said fuel cells during the design life of said module;

wherein a stack height Y is the maximum height at which the axial compressive load on said stack still results in acceptable electrical resistance and thermal conductivity through the stack and adequate reactant gas sealing between said cell components;

wherein the thermal expansion characteristics of said module are such that, at maximum operating temperature, the axial distance between said end blocks would increase by an amount $\Delta X$, and $X + \Delta X \leq Y$ under all conditions;

wherein Z is the lowest axial load on said stack of cells which, at any stack height less than or equal to Y, will ensure acceptable electrical resistance and thermal conductivity through the stack and adequate reactant gas sealing between said cell components; and wherein if the compressive force at time zero is F at room temperature, the creep characteristics, thermal expansion characteristics, and spring rate of said stack would result in a reduction of the force F by an amount $\Delta F$ over the design life of said module and $F - \Delta F \geq Z$.

2. The fuel cell module according to claim 1 wherein said constraint means is tie rods.

3. The fuel cell module according to claim 1 wherein said constraint means is said reactant gas manifolds.

4. The fuel cell module according to claim 3 wherein each of said reactant gas manifolds includes means fixedly secured to each of said end blocks.

5. The fuel cell module according to claim 1 wherein each of said fuel cells includes a pair of electrodes, each electrode comprising a substrate having reactant gas carrying channels formed therein extending across said substrate perpendicular to said stack axis, said substrates comprising carbon fibers bonded together by a resin.

6. The fuel cell module according to claim 1, 3, or 4 wherein said module includes a plurality of bands surrounding said stack of cells and sealingly holding said manifolds against said planar surfaces.

* * * * *